United States Patent
Wang et al.

(10) Patent No.: US 10,819,256 B2
(45) Date of Patent: Oct. 27, 2020

(54) MOTOR DRIVING METHOD, MOBILE TERMINAL, AND COMPUTER-READABLE STORAGE MEDIUM

(71) Applicant: AAC Technologies Pte. Ltd., Singapore (SG)

(72) Inventors: Xiuyue Wang, Shenzhen (CN); Yulei Zhang, Shenzhen (CN); Dongping Deng, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/524,163

(22) Filed: Jul. 28, 2019

(65) Prior Publication Data
US 2020/0044584 A1 Feb. 6, 2020

(30) Foreign Application Priority Data
Aug. 1, 2018 (CN) .......................... 2018 1 0865070

(51) Int. Cl.
| | |
|---|---|
| H04M 3/02 | (2006.01) |
| H02P 6/06 | (2006.01) |
| H02P 6/22 | (2006.01) |
| H02P 6/24 | (2006.01) |
| H04W 4/02 | (2018.01) |

(52) U.S. Cl.
CPC .................. *H02P 6/06* (2013.01); *H02P 6/22* (2013.01); *H02P 6/24* (2013.01); *H04W 4/026* (2013.01); *H04W 4/027* (2013.01)

(58) Field of Classification Search
CPC .... H02P 6/06; H02P 6/22; H02P 5/68; H04W 4/026; H04W 4/027
See application file for complete search history.

(56) References Cited

U.S. PATENT DOCUMENTS

| | | | |
|---|---|---|---|
| 2017/0032692 A1* | 2/2017 | Choi | H04W 4/02 |
| 2017/0086281 A1* | 3/2017 | Avrahamy | A01G 7/045 |

* cited by examiner

*Primary Examiner* — Muhammad S Islam
(74) *Attorney, Agent, or Firm* — W&G Law Group LLP

(57) ABSTRACT

The present disclosure relates to the field of intelligent devices, and discloses a motor driving method, a mobile terminal, and a computer-readable storage medium. In the present disclosure, the method is applied to a mobile terminal, where a first motor and a second motor are built in the mobile terminal, and the first motor and the second motor are located on opposite parts of the mobile terminal. A first drive signal for driving the first motor to vibrate and a second drive signal for driving the second motor to vibrate are obtained, a rotation angle of the mobile terminal, when the first motor and the second motor are both in a vibration state, are monitored in real time, and the first drive signal and the second drive signal are interchanged when it is detected that the mobile terminal rotates half a turn.

9 Claims, 3 Drawing Sheets

MOTOR DRIVING METHOD, MOBILE TERMINAL, AND COMPUTER-READABLE STORAGE MEDIUM

TECHNICAL FIELD

The present disclosure relates to the field of intelligent devices, and in particular, to a motor driving method, a mobile terminal, and a computer-readable storage medium.

BACKGROUND

Motors provide tactile experience to users, and good vibration feedback can bring different product experience to the users. Currently, motor products on the market have been widely applied, and mostly can meet requirements of users. When a user uses a mobile terminal, using a motor in a mobile terminal to enhance user experience has been a widely used technical means.

However, the inventor of the present disclosure finds that most of existing motors vibrate according to a preset vibration state, while after screens of mobile terminals rotate, users cannot perceive vibration sensation the same as that perceived before the rotation.

DETAILED DESCRIPTION

To make the objectives, technical solutions, and advantages of the embodiments of the present disclosure clearer, the following further describes embodiments of the present disclosure in detail with reference to the accompanying drawings. However, those of ordinary skill in the art may understand that, in the various embodiments of the present disclosure, numerous technical details are set forth to provide the reader with a better understanding of the present disclosure. However, the technical solutions claimed in the present disclosure can further be implemented without these technical details and various changes and modifications based on the following embodiments.

An embodiment of the present disclosure relates to a motor driving method. In this embodiment, a first drive signal for driving a first motor to vibrate and a second drive signal for driving a second motor to vibrate are obtained; a rotation angle of a mobile terminal when the first motor and the second motor are both in a vibration state is monitored in real time; and the first drive signal and the second drive signal are interchanged when it is detected that the mobile terminal rotates half a turn. In this way, when terminals rotate half a turn, motor vibration sensation perceived by a user is the same, thereby ensuring user experience. The following specifically describes implementation details of the motor driving method in this embodiment, and the following content is merely implementation details provided for convenience of understanding, and is not necessary for implementing this solution.

Figure 1:
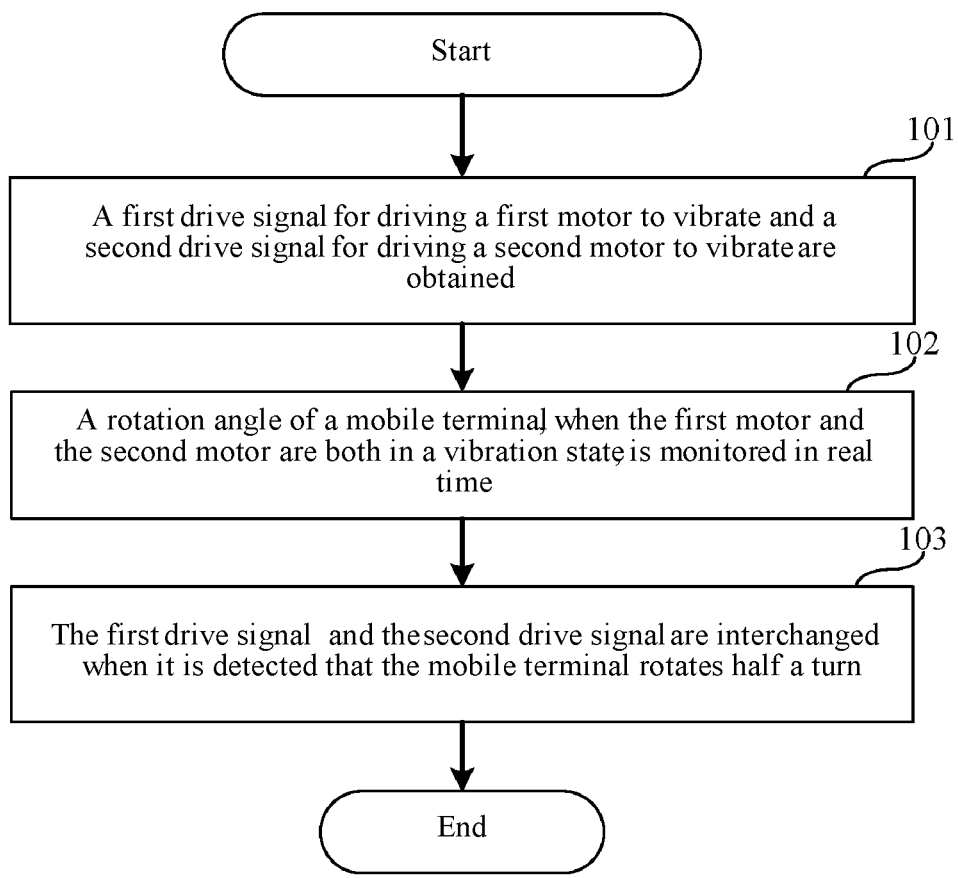
FIG. 1 is a flowchart of a motor driving method according to an embodiment of the present disclosure.

As shown in FIG. 1, a motor driving method according to this embodiment is applied to a mobile terminal, where a first motor and a second motor are built in the mobile terminal, and the first motor and the second motor are located on opposite parts of the mobile terminal.

The method includes obtaining 101-*a* first drive signal for driving the first motor to vibrate and a second drive signal for driving the second motor to vibrate.

Specifically, because the mobile terminal has two motors and the two motors are located on opposite parts of the mobile terminal, that is, the opposite parts of the mobile terminal may be a left part and a right part, or the opposite parts of the mobile terminal may be the top part and the bottom part of the mobile terminal. A drive signal for driving a motor to vibrate is needed when the motor is expected to vibrate. When a mobile terminal has two motors, the mobile terminal uses two drive signals to drive a first motor and a second motor respectively. Which is the first motor and which is the second motor may be defined by the user or the manufacturer of the mobile terminal. A method for obtaining the drive signals may be: obtaining a signal parameter of the first drive signal and a signal parameter of the second drive signal. Because a corresponding drive signal may be generated according to a signal parameter, obtaining the signal parameters is equivalent to obtaining the first drive signal and the second drive signal.

The method includes monitoring 102, in real time,—a rotation angle of the mobile terminal when the first motor and the second motor are both in a vibration state.

Specifically, when the first motor and the second motor in the mobile terminal are in the vibration state, the rotation angle of the mobile terminal is monitored in real time. Herein, the rotation angle of the mobile terminal may be an angle at which a screen rotates without changing a plane of the mobile terminal, or an angle at which a screen rotates and that is detected by monitoring a screen orientation of the mobile terminal when the mobile terminal is in a landscape state.

The method includes interchanging 103 the first drive signal and the second drive signal when it is detected that the mobile terminal rotates half a turn.

Specifically, when the mobile terminal rotates half a turn, a part which is held by a user's left hand is changed to be held by the right hand and a part which is held by the user's right hand is changed to be held by the left hand. If it is expected that motor vibration sensation perceived by the user's hands after the mobile terminal rotates half a turn is still the same as that perceived before the rotation, the first drive signal and the second drive signal are interchanged. In this way, drive signals are also interchanged at the same time when spatial locations of the motors are interchanged because the mobile terminal rotates half a turn. The drive signals determine vibration sensation of the motor. Therefore, vibration sensation of the motor perceived by the user's hands after the mobile terminal rotates half a turn is still the same as that perceived before the rotation.

For example, before the rotation, a vibration speed of the first motor is 10 mm/s, vibration of the first motor is perceived by the user's left hand, a vibration speed of the second motor is 5 mm/s, and vibration of the second motor is perceived by the user's right hand. When the mobile terminal rotates half a turn, the first drive signal and the second drive signal are interchanged. Therefore, the vibration speed of the first motor is changed to 5 mm/s and the vibration speed of the second motor is changed to 10 mm/s. In this case, because the vibration of the second motor is perceived by the user's left hand and the vibration of the first motor is perceived by the user's right hand, the user can perceive the same motor vibration after the mobile terminal rotates half a turn, thereby ensuring user experience.

A method for monitoring whether the mobile terminal rotates half a turn may be: monitoring a screen orientation of the mobile terminal, and determining whether the mobile terminal rotates half a turn according to a change of the screen orientation of the mobile terminal; and interchanging the first drive signal and the second drive signal if a determining result is yes. The screen orientation may be obtained by monitoring orientations of the top or the bottom of the mobile terminal. A method for monitoring the screen orientation may be monitoring the screen orientation of the mobile terminal by using an acceleration sensor built in the mobile terminal.

When the signal parameter of the first drive signal and the signal parameter of the second drive signal are obtained, the method for interchanging the first drive signal and the second drive signal may be: updating the signal parameter of the first drive signal to be the signal parameter of the second drive signal, and updating the signal parameter of the second drive signal to be the signal parameter of the first drive signal. Because a corresponding drive signal can be generated according to a signal parameter, interchanging the signal parameter of the first drive signal and the signal parameter of the second drive signal is equivalent to interchanging the first drive signal and the second drive signal. In this way, the user can perceive the same motor vibration after the mobile terminal rotates half a turn, thereby ensuring user experience.

Compared with the existing technology, in this embodiment, the first drive signal and the second drive signal are obtained; the rotation angle of the mobile terminal, when the first motor and the second motor are both in the vibration state, is monitored in real time; and the first drive signal and the second drive signal are interchanged when it is detected that the mobile terminal rotates half a turn. In this way, the user can perceive the same motor vibration after the terminal rotates half a turn, thereby ensuring user experience.

Figure 2:
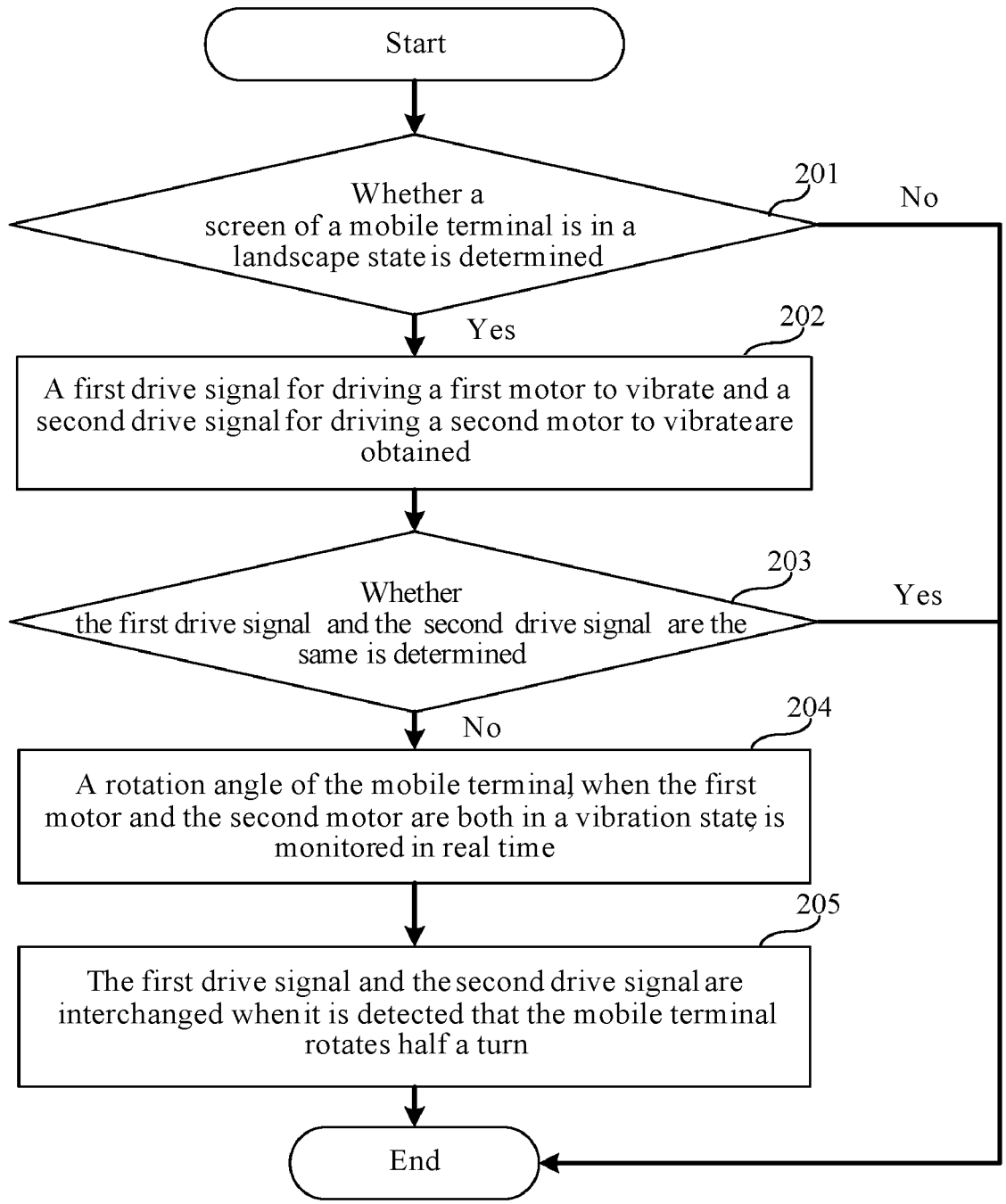
FIG. 2 is a flowchart of a motor driving method according to another embodiment of the present disclosure.

An embodiment of the present disclosure relates to a motor driving method. This embodiment makes an improvement based on the above-described embodiment. The improvement lies in that: in this embodiment, the step of obtaining a first drive signal for driving the first motor to vibrate and a second drive signal for driving the second motor to vibrate is triggered when it is detected that a screen of the mobile terminal is in a landscape state. Before monitoring in real time a rotation angle of the mobile terminal when the first motor and the second motor are both in a vibration state, the method further includes: determining whether the first drive signal and the second drive signal are the same; and executing, if a determining result is no, the step of monitoring in real time a rotation angle of the mobile terminal when the first motor and the second motor are both in a vibration state. A method for monitoring the motor vibration in this embodiment is shown in FIG. 2.

The method includes determining 201 whether a screen of a mobile terminal is in a landscape state. If the screen of the mobile terminal is in the landscape state, perform step 202. If the screen of the mobile terminal is not in the landscape state, this procedure ends.

Specifically, when using the mobile terminal, a user usually holds one part of the screen of the mobile terminal by the left hand, and holds other part of the screen of the mobile terminal by the right hand. When the mobile terminal is in the landscape state, the user holds the top or the bottom of the mobile terminal separately by two hands. This is a common method for using a mobile terminal by a user.

Determining whether the screen of the mobile terminal is in the landscape state is to ensure that when the screen of the mobile terminal is in the landscape state, the user can perceive the same vibration after the screen of the terminal rotates half a turn, thus facilitating this implementation. In this embodiment, a method is provided for enabling the user to perceive the same vibration when the mobile terminal rotates half a turn if the mobile terminal is in the landscape state. In actual applications, it may be set that when the mobile terminal is located on a preset location, the user can perceive the same vibration even though the terminal rotates half a turn.

The method includes obtaining 202a first drive signal for driving a first motor to vibrate and a second drive signal for driving a second motor to vibrate. Because step 202 in this embodiment and step 101 in the above-described embodiment are basically the same, details are not described herein again.

The method includes determining 203 whether the first drive signal and the second drive signal are the same. If no, perform step 204; or if yes, the procedure ends.

Specifically, when the first drive signal and the second drive signal are the same, there is no need to monitor in real time a rotation angle of the mobile terminal when the first motor and the second motor are both in a vibration state. The rotation angle of the mobile terminal, when the first motor and the second motor are both in the vibration state, is monitored in real time to interchange the first drive signal and the second drive signal when the mobile terminal rotates half a turn. In this way, the user can perceive the same motor vibration even though the terminal rotates half a turn. However, if the first drive signal and the second drive signal are the same, the first drive signal and the second drive signal do not need to be interchanged when the terminal rotates half a turn, and vibration of the two motors that is provided for the user is still the same as that obtained before the terminal rotates half a turn. Therefore, when it is determined that the first drive signal and the second drive signal are the same, the rotation angle of the mobile terminal when the first motor and the second motor are both in the vibration state does not need to be monitored in real time, thereby saving power of the terminal, less using processing resources of the terminal, and improving user experience.

The method includes monitoring 204, in real time, a rotation angle of the mobile terminal when the first motor and the second motor are both in a vibration state. Because step 204 in this embodiment and step 102 in the above-described embodiment are basically the same, details are not described herein again.

The method includes interchanging 205 the first drive signal and the second drive signal when it is detected that the mobile terminal rotates half a turn. Because step 205 in this embodiment and step 103 in the above-described embodiment are basically the same, details are not described herein again.

Compared with the existing technology, in this embodiment, the first drive signal for driving the first motor to vibrate and the second drive signal for driving the second motor to vibrate are obtained when it is detected that the screen of the mobile terminal is in the landscape state. When the first drive signal and the second drive signal are different, the rotation angle of the mobile terminal, when the first motor and the second motor are both in the vibration state, is monitored in real time. When it is detected that the mobile terminal rotates half a turn, the first drive signal and the second drive signal are interchanged. In this way, the user can perceive the same vibration after the mobile terminal rotates half a turn, thereby less using processing resources of the terminal, and improving user experience.

Division of the steps of the foregoing methods is only for ease of description, and during implementation, the steps may be combined into one step or some steps may be split into multiple steps. All shall fall within the protection scope of the present disclosure provided that a same logical relationship is included. Insignificant modifications added to or insignificant designs introduced in an algorithm or a procedure without changing the core of the algorithm or the procedure shall fall within the protection scope of the present disclosure.

Figure 3:
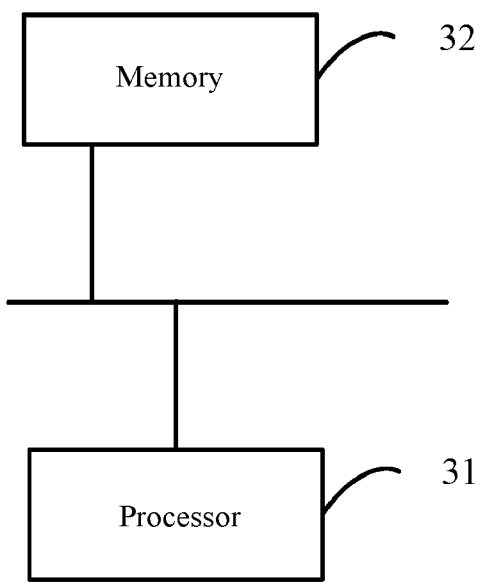
FIG. 3 is a schematic structural diagram of a mobile terminal according to an embodiment of the present disclosure.

An embodiment of the present disclosure relates to a mobile device, as shown in FIG. 3, including at least one processor 31 and a memory 32 communicatively connected with the at least one processor 31. The memory stores instructions executable by the at least one processor 31. The instructions, when executed by the at least one processor 31, causes the at least one processor 31 to perform the motor driving method according to any one of the above-described embodiments of the present disclosure.

The memory 32 and the processor 31 are connected by using a bus. The bus may include any quantity of interconnected buses and bridges. The bus connects various circuits of the one or more processors 31 and the memory 32. The bus may also connect various other circuits such as a peripheral device, a voltage regulator, and a power management circuit. These are known in the art, and details are not described herein. A bus interface provides an interface between the bus and a transceiver. The transceiver may be one element or a plurality of elements such as a plurality of receivers and transmitters, and serves as a unit configured to communicate with various other apparatuses over a transmission medium. Data processed by the processor 31 is transmitted over a wireless medium by using an antenna. The antenna further receives data and transmits the data to the processor 31.

The processor 31 is responsible for managing the bus and general processing, and may further provide various functions including timing, a function of the peripheral interface, voltage adjustment, power supply management, and other control functions. The memory 32 may be configured to store data used by the processor 31 when performing an operation.

An embodiment of the present disclosure relates to a computer-readable storage medium storing a computer program. The foregoing method embodiment is implemented when the computer program is executed by a processor.

That is, those skilled in the art may understand that all or some of the steps in the methods according to the foregoing embodiments may be implemented by a program instructing relevant hardware. The program is stored in a storage medium and includes several instructions to enable a device (which may be a single-chip microcomputer, a chip, or the like) or a processor to implement all or some of the steps in the methods according to the foregoing embodiments of the present disclosure. The storage medium includes any medium that can store program code, such as a USB flash memory drive, a removable hard disk, a read-only memory (ROM), a random access memory (RAM), a magnetic disk, or an optical disc.

Those of ordinary skill in the art may understand that, the embodiments described above are specific embodiments for implementing the present disclosure, and in actual applications, various changes may be made to the embodiments in form and detail without departing from the spirit and scope of the present disclosure.

What is claimed is:

1. A motor driving method, applied to a mobile terminal, wherein a first motor and a second motor are built in the mobile terminal, and the first motor and the second motor are located on opposite parts of the mobile terminal; the method comprises:
   obtaining a first drive signal for driving the first motor to vibrate and a second drive signal for driving the second motor to vibrate;
   monitoring, in real time, a rotation angle of the mobile terminal when the first motor and the second motor are both in a vibration state; and
   interchanging the first drive signal and the second drive signal when it is detected that the mobile terminal rotates half a turn.

2. The motor driving method according to claim 1, wherein the interchanging the first drive signal and the second drive signal when it is detected that the mobile terminal rotates half a turn specifically comprises:
   monitoring a screen orientation of the mobile terminal, and determining whether the mobile terminal rotates half a turn according to a change of the screen orientation of the mobile terminal; and
   interchanging the first drive signal and the second drive signal when it is detected that the mobile terminal rotates half a turn.

3. The motor driving method according to claim 2, wherein the monitoring a screen orientation of the mobile terminal comprises:
   monitoring the screen orientation of the mobile terminal by using an acceleration sensor built in the mobile terminal.

4. The motor driving method according to claim 2, further comprising:
   triggering the obtaining a first drive signal for driving the first motor to vibrate and a second drive signal for driving the second motor to vibrate when it is detected that a screen of the mobile terminal is in a landscape state.

5. The motor driving method according to claim 1, wherein before the monitoring in real time a rotation angle of the mobile terminal when the first motor and the second motor are both in a vibration state, the method further comprises:
   determining whether the first drive signal and the second drive signal are the same; and
   executing, when the first drive signal is different from the second drive signal, the monitoring in real time a rotation angle of the mobile terminal when the first motor and the second motor are both in a vibration state.

6. The motor driving method according to claim 1, wherein the opposite parts of the mobile terminal specifically are the top part and the bottom part of the mobile terminal.

7. The motor driving method according to claim 1, wherein the obtaining a first drive signal for driving the first motor to vibrate and a second drive signal for driving the second motor to vibrate specifically comprises:
   obtaining a signal parameter of the first drive signal and a signal parameter of the second drive signal; and
   the interchanging the first drive signal and the second drive signal specifically comprises:
   updating the signal parameter of the first drive signal to the signal parameter of the second drive signal; and
   updating the signal parameter of the second drive signal to the signal parameter of the first drive signal.

8. A mobile device, comprising:
at least one processor; and
a memory communicatively connected with the at least one processor;
wherein the memory stores instructions executable by the at least one processor;
wherein the instructions, when executed by the at least one processor, causes the at least one processor to perform a motor driving method;
wherein the method comprises:
obtaining a first drive signal for driving the first motor to vibrate and a second drive signal for driving the second motor to vibrate;
monitoring, in real time, a rotation angle of the mobile terminal when the first motor and the second motor are both in a vibration state; and
interchanging the first drive signal and the second drive signal when it is detected that the mobile terminal rotates half a turn.

9. A computer-readable storage medium storing a computer program, wherein the computer program, when executed by a processor, implements a motor driving method;
wherein the method comprises:
obtaining a first drive signal for driving the first motor to vibrate and a second drive signal for driving the second motor to vibrate;
monitoring, in real time, a rotation angle of the mobile terminal when the first motor and the second motor are both in a vibration state; and
interchanging the first drive signal and the second drive signal when it is detected that the mobile terminal rotates half a turn.

* * * * *